United States Patent Office 2,907,727
Patented Oct. 6, 1959

2,907,727
AUTOESTER-POLYEPOXIDE COMPOSITIONS

Sylvan O. Greenlee, Racine, Wis., assignor to S. C. Johnson & Son, Inc., Racine, Wis.

No Drawing. Application January 28, 1957
Serial No. 636,505

14 Claims. (Cl. 260—19)

This invention relates to new products and compositions resulting from the reaction of polyepoxides with autoesters of aryloxy acids and the modification of such compositions with condensates of aldehydes and ammonia derivatives, or condensates of aldehydes and phenols, in regulated proportions to produce valuable compositions useful in the manufacture of varnishes, molding compositions, adhesives, films and molded articles. The invention includes initial reaction mixtures or compositions as well as intermediate and final reaction products and methods for their production.

It is an object of this invention to produce new compositions of matter from suitable proportions of aryloxy acid autoesters and polyepoxides with or without modification with aldehyde condensates, which compositions are suitable for use in coating compositions, molding compositions and adhesives.

Another object of this invention is the production of reaction mixtures of the aforesaid epoxides and aryloxy acid autoesters with or without aldehyde condensates which are capable of reaction on the application of heat to form infusible, insoluble products.

Another object of this invention is the production of new reaction mixtures, as described above, which are stable at ordinary temperatures for long periods of time and which may be converted to insoluble, infusible products by the application of heat with or without the addition of catalyst.

Another object of this invention is to provide for the production of co-conversion products of polyepoxides and aryloxy acid autoesters or said products modified with aldehyde condensates, with such co-conversion products being characterized by extreme hardness, flexibility, and resistance to water, alkali, and organic solvents.

Other objects of the invention will appear from the following more detailed description with particular reference to the illustrative examples.

In general, the polyepoxides contemplated for use with the aryloxy acid autoesters to prepare the compositions of this invention are compounds containing an average of more than one, up to about twenty epoxide groups, per molecule. Such compounds, free from functional groups other than epoxide, carboxyl, and hydroxyl groups, are reactive with active hydrogen-containing groups such as the carboxyl groups supplied by the aryloxy acid autoesters herein contemplated. Typical epoxides which have been found to be operable are complex resinous polyepoxides, resinous polyepoxide polyesters, epoxidized natural oils, and simple aliphatic polyepoxides.

The reaction products of this invention are prepared by converting the epoxide groups with the aryloxy acid autoesters, which are derivatives of a bis(arylene)-substituted aliphatic acid and, if desired, modifying said compositions with aldehyde condensates. Conversion of the epoxide groups is effected by active hydrogen present in the hydroxyl, carboxyl or amino groups which may be supplied by the other reactants.

The aryloxy acid autoesters suitable for use in preparing the compositions of this invention are described in detail in the copending Greenlee application, Serial No. 514,377 filed June 9, 1955. They may be prepared by heating an aryloxy acid in the presence of acetic anhydride as illustrated by the following:

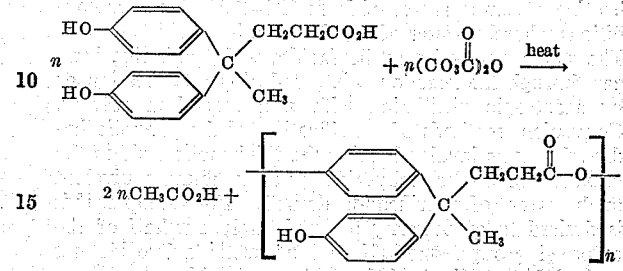

It is to be understood that the product of the illustrative reaction is only one of a mixture of materials actually produced. Whenever both hydroxyl groups of the Diphenolic Acid are esterified, a branched structure, rather than the illustrated linear configuration, would result.

The invention embraces using autoesters containing any number of monomeric units. Thus in Equation I above, $n$ may represent any integer greater than 1. In compositions where $n$ is a value greater than about 15, the autoester is ordinarily difficult to handle since the mass becomes insoluble, and infusible, and cannot be readily dissolved.

Further valuable variations in the type of composition obtained may be effected by varying the number of carboxyl groups esterified, resulting in resinous polyhydric phenols containing a desired amount of unreacted carboxylic acid. To illustrate this type of composition, the reaction between 2 molecules of 4,4-bis(4-hydroxyphenyl)pentanoic acid results in an essentially resinous triphenolic acid.

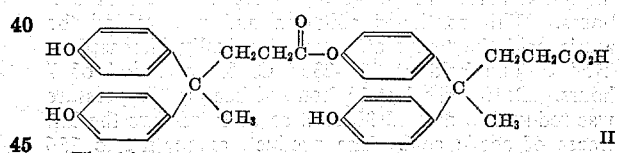

The bis(hydroxyaryl)substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid must be positioned next to a terminal methyl group in order to obtain satisfactory yields. Prior applications, Serial Nos. 464,607 and 489,300, filed October 25, 1954, and Februrary 18, 1955, respectively, disclose a number of illustrative compounds suitable for use as the aryloxy-substituted acid, and methods of preparing the same. These materials, which are referred to for convenience by the trademarks of S. C. Johnson & Son, Inc., as Diphenolic Acid or DPA, consist of the condensation products of a keto-acid such as levulinic and phenol, substituted phenols, or mixtures thereof. It has been found that the phenolic nuclei of the Diphenolic Acid may be substituted with any group which will not interfere with the reactions contemplated. For example, the nuclei may be alkylated with alkyl groups of from 1 to 5 carbon atoms as disclosed in Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility and water resistance. However, the unsubstituted product is usually more readily purified.

The resinous polyhydric phenols are prepared by autoesterification of up to one-half the phenolic hydroxyl groups of Diphenolic Acid with the carboxyl group of other molecules of Diphenolic Acid. Partial esterification to give products having appreciable acid values, such as that represented by II above, may be carried out by heating at temperatures of from 190–275° C. under conditions whereby water of esterification is readily removed. The water removal may be facilitated by bubbling inert gas through the reaction mixture during esterification or by azeotropic distillation with a hydrocarbon solvent. Convenient methods of esterification of the phenolic hydroxyl groups involve heating the Diphenolic Acid in the presence of acetic anhydride in an amount equivalent to the extent of esterification desired. For example, if it is desired to autoesterify approximately one-half of the carboxyl groups, one-half mol of acetic anhydride per mol of Diphenolic Acid should be used. If approximately complete autoesterification of the carboxyl groups is desired, at least 1 mol of acetic anhydride per mol of Diphenolic Acid should be used. Where more than the equivalent amount of acetic anhydride is used in the process, a portion of the phenolic hydroxyl groups not esterified by the carboxyl group of the Diphenolic Acid are acetylated and the amount of active hydrogen available for the reactions of this invention is correspondingly reduced.

Examples I to III inclusive describe the preparation of autoesters of Diphenolic Acid. Proportions expressed in these and subsequent examples refer to parts by weight unless otherwise indicated.

EXAMPLE 1

A mixture of 286 parts of 4,4-bis(4-hydroxyphenyl)-pentanoic acid and 102 parts of acetic anhydride in a 3-neck flask provided with a thermometer, a mechanical agitator, and a reflux condenser was heated with continuous agitation at 148–170° C. for a period of 2½ hours. With continued agitation and removal of the acetic acid the temperature was gradually increased to 215° C. and held at 215–235° C. for a period of 7 hours. During the last ½ hour of heating the pressure was reduced to around 30 mm. so as to remove the last traces of acetic acid. The product, amounting to 256 parts had an acid value of 9.6 and a softening point (Durrans' mercury method) of 124° C.

EXAMPLE 2

By the same procedure as in Example 1 a mixture of 286 parts of 4,4-bis(4-hydroxyphenyl)pentanoic acid and 102 parts of acetic anhydride was heated at 145–178° C. for a period of 1½ hours. The temperature was then raised to 220° C. over a period of ¾ hour and held at this temperature for a period of 2 hours reducing the pressure to around 30 mm. during the last half-hour of reaction time. The product, amounting to 272 parts, had an acid value of 44.7 and a softening point of 124° C.

EXAMPLE 3

In a 3-neck flask provided with a thermometer, a mechanical agitator, and a reflux condenser attached to the condenser through a water trap for collection of distillate was placed 286 parts of 4,4-bis(4-hydroxyphenyl)-pentanoic acid. With continuous agitation the temperature was raised to 200° C. and held at 200–210° C. for a period of 7 hours, collecting water formed from condensation by distillation into the water trap. The resulting product, amounting to 276 parts, had an acid value of 99.3 and a softening point of 45° C.

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by III to V below where $n$ equals zero. Preparation of these epoxide materials as well as illustrative examples are described in U.S. Patents, 2,456,408, 2,503,726, 2,615,007, 2,615,008, 2,688,805, 2,668,807 and 2,698,315. Well known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

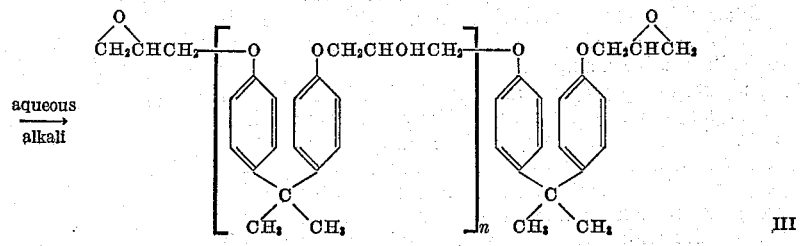

Polyhydric phenol and a polyepoxide bis(hydroxyphenyl)isopropylidene + excess butylene dioxide

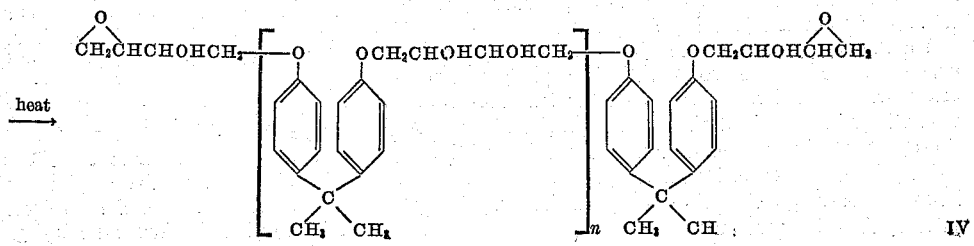

Polyhydric phenol and a polyhalohydrin bis(hydroxyphenyl)isopropylidene + excess α-glycerol dichlorohydrin

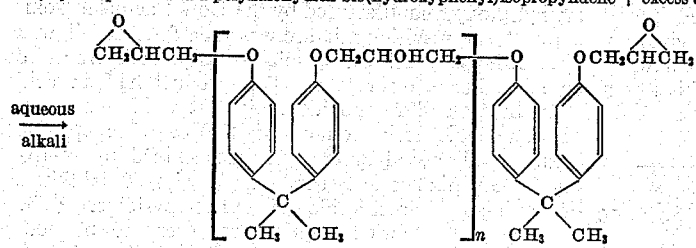

aqueous alkali →

V

As used in the above formulas, $n$ indicates the degree of polymerization, and its value depends on the molar ratio of reactants. As can be seen from these formulas, the complex epoxide resins used in this invention contain terminal epoxide groups, and alcoholic hydroxyl groups attached to the aliphatic portions of the resin, the latter being formed by the splitting of epoxide groups in the reaction of the same with phenolic hydroxyl groups. Ultimately the reaction with the phenolic hydroxyl groups of the polyhydric phenols is accomplished by means of epoxide groups formed from halohydrins by the loss of hydrogen and halogen generally as shown by the following equation:

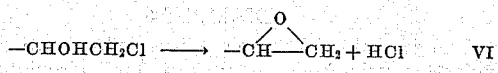
VI

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long-chain aliphatic acid esters containing from about 15 to 22 carbon atoms. These acids may be esterified by simple monohydric alcohols such as methyl, ethyl or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain from more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid, and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion.

This reaction may be carried out so as to give higher polymers than the dimer shown. Other aliphatic polyepoxides useful in this invention may be illustrated by the poly(epoxyalkyl) ethers derived from polyhydric alcohols. These materials may in general be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

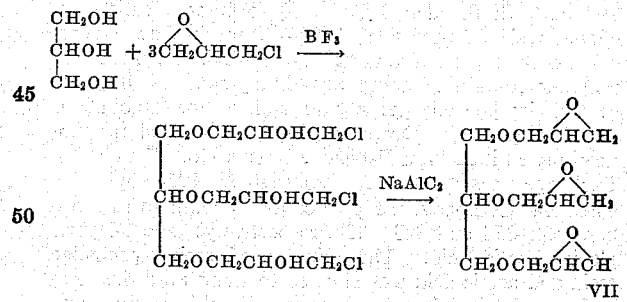
VII

It is to be understood that such reactions do not give pure compounds, and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive, and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)isopropylidene with a molar excess of epichlorohydrin in varying amounts.

| Epon resin type | Melting point, °C. | Viscosity [1] (Gardner-Holdt) | Epoxide equivalent | Average molecular weight |
| --- | --- | --- | --- | --- |
| Epon 864 | 40–45 | A–B | 325 | 450 |
| Epon 1001 | 64–76 | C–G | 480 | 640 |
| Epon 1004 | 95–105 | Q–U | 870 | 1,133 |
| Epon 1007 | 127–133 | Y–Z₁ | 1,750 | |

[1] Based on 40% nonvolatile in butyl carbitol at 25° C.

Examples 4 through 6 describe the preparation of typical polyepoxide polyesters.

EXAMPLE 4

*Preparation of polyester from tetrahydrophthalic anhydride and ethylene glycol*

In a 3-neck flask provided with a thermometer, mechanical agitator, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-neck flask provided with a thermometer, a mechanical agitator, and a reflux condenser was placed 107 parts of the dehydrated acid form of a cation exchange resin (Dowex 50X–8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyrighted 1954 by Dow Chemical Company, the publications having form number Sp32–254 and Sp31–354, respectively), and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 4.2. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR'₃N⁺OH⁻ where R represents the styrene-divinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on on nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE 5

Following the procedure of Example 4, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE 6

The process of Example 4 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples 7 and 8 describe the preparation of epoxidized vegetable oil acid esters.

EXAMPLE 7

*Epoxidized soya bean oil acid modified alkyd resin* a. *Preparation of alkyd resin.*—To a kettle provided with a condenser was added 290 parts of white refined soya bean oil. While bubbling a continuous stream of nitrogen through this oil, the temperature was raised to 250° C., at which temperature 0.23 part of litharge was added and the temperature held at 250° C. for 5 minutes. While holding the temperature above 218° C., 68 parts of technical pentaerythritol was added after which the temperature was raised to 238° C. and held until a mixture of 1 part of the product and 2½ parts of methyl alcohol showed no insolubility (about 15 minutes). At this point 136 parts of phthalic anhydride was added and the temperature gradually raised to 250° C. and held at this temperature for 30 minutes. At this point the condenser was removed from the kettle and the pressure reduced somewhat by attaching to a water aspirator evacuating system. With continuous agitation the mixture was then held at 250° C. until the acid value had reached 10.5. At this point the resin was thinned with xylene to 48% nonvolatile content having a viscosity of H (Gardner bubble viscosimeter).

b. *Epoxidation of a soya bean oil acid modified alkyd resin.*—In a 3-neck flask provided with a thermometer, a mechanical agitator and a reflux condenser was placed 70 parts of dehydrated acid form of a cation exchange resin (Dowex 50X–8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution was thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE 8

*Epoxidized soya bean oil*

Admex 710, an epoxidized soya bean oil having an equivalent weight to an epoxide of 263, was dissolved in methyl ethyl ketone to a nonvolatile content of 50%. Admex 710, a product of the Archer-Daniels-Midland Company has an acid value of 1, a viscosity of 3.3 stokes at 25° C. and an average molecular weight of 937.

Examples 9 and 10 describe the preparation of simple aliphatic polyepoxides.

EXAMPLE 9

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature the inorganic material was removed by filtration. The dioxane and low boiling products were removed by heating the filtrate to 205° C. at 20 mm. pressure to give 260 parts of a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE 10

In a 3-neck flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418 and equivalent weight to epoxide content of 198 the yield amounting to 250 parts.

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention, the phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times incompatible with the resin with which it is used. Adhesion to metals also appears to be better in the phenol-aldehyde condensates. From an economic standpoint, the phenol-aldehyde condensates are advantageous, being lower in price.

The aldehyde-ammonia derivative condensation products are formed by the reaction of aldehydes with amines or amides such as urea, thiourea, and their derivatives, melamines and sulfonamides. It is well known that various amines and amides will react with formaldehyde to form aldehyde-amine or aldehyde-amide condensates. A number of derivatives of the amines and amides mentioned are also contemplated herein. Exemplary derivatives are substituted urea, thiourea, or melamine such as the long-chain alkyl substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate, and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, cross-linked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative, in order to be suitable for condensation with an aldehyde must contain at least one hydrogen atom attached to the nitrogen atom. Fusible materials of varying degrees of condensation may be used with the epoxides and the autoesters to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the epoxide composition and the autoester composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the aryloxy acid autoesters according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve epoxide and the autoester. Solutions prepared in this manner can be applied as a coating and the solvent subsequently evaporated before the main reaction between the epoxide, aryloxy acid autoester, and condensate takes place.

Examples 11 to 15 inclusive describe the preparation of typical ammonia derivative-aldehyde condensates suitable for use herein.

EXAMPLE 11

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

EXAMPLE 12

The procedure of preparation including the water removal was the same as that used in Example 11. A mixture of 304 parts of thiourea, 960 parts of 37% aqueous formaldehyde, and 800 parts of n-butyl alcohol was used to give a final yield of 1214 parts of a clear, light amber, syrupy product.

EXAMPLE 13

The procedure of preparation including the removal of water was the same as that used in Example 11. A mixture of 120 parts of urea, 148 parts of thiourea, 950 parts of 37% aqueous formaldehyde, and 800 parts of n-butyl alcohol was used to give a final yield of 1175 parts of a clear, almost colorless syrupy liquid.

EXAMPLE 14

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water white, heavy, syrupy liquid.

EXAMPLE 15

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 64.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water white resinous solid.

The second class of condensates suitable for modifying the compositions herein described are those which contain reactive phenolic hydroxyl groups, formed by the reaction of phenols and aldehydes. Phenol and formaldehyde react to form a variety of reaction products, depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions, that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and autoesters for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and autoesters or with the two reactants in a solvent used as a reaction medium. The phenol-aldehyde condensate which is essentially a polymethylol phenol rather than a polymer may be used in the preparation of the new phenol-aldehyde, polyepoxide, autoester condensation products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and autoesters and reacted therewith to form the products of this invention.

In selecting a phenol-aldehyde condensate one may choose either the heat-converting or the permanently fusible type. For example, the formaldehyde reaction products of such phenols as carbolic acid, resorcinol, and bis(4-hydroxyphenyl)isopropylidene readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the autoesters described.

Examples 16 to 18, inclusive, describe the preparation of some of the operable phenol-aldehyde condensates which may be used in combination with the polyepoxides and the aryloxy acid autoesters to form the products herein described.

EXAMPLE 16

*Condensation of Bisphenol [bis(para-hydroxyphenyl) isopropylidene] with formaldehyde*

In a 3-liter, 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

EXAMPLE 17

*Reaction of p-tertiary butylphenol with formaldehyde*

The procedure of preparation, including the dehydration step, was the same as that used in Example 16. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

EXAMPLE 18

*Reaction of phenol with formaldehyde*

Again a reaction procedure including the dehydration step was the same as that used in Example 16. A mixture of 658 parts of phenol, 1400 parts of 37% aqueous formaldehyde, and 6.6 parts of sodium hydroxide was used to give a final yield of 1168 parts of a clear, syrupy product.

In making the new compositions, the polyepoxide and autoester or such compositions modified with aldehyde condensates are admixed in suitable proportions and reaction will proceed merely by the application of heat. More specifically the reaction is effected by heating the mixtures at elevated temperatures, usually in the range of about 100–250° C. Catalysts are unnecessary, but in certain cases it may be desirable to speed up the reaction by the use of catalysts, such as boron trifluoride adducts, sodium phenoxides, and mineral acid type catalysts. The reaction mixtures and final reaction products of this invention may be prepared by using varying ratios of epoxide to autoester. The quantities of reactants employed in a given instance will depend upon the characteristics desired in the final product. Flexible conversion products can be obtained from a hard epoxide by employing relatively large amounts of a low-melting autoester or a low-melting autoester and a low-melting phenol-aldehyde condensate or flexibility may be imparted by larger amounts of a soft epoxide. In general, operable products are those in which the ratio of epoxide to autoester ranges from about 6:1 to 1:6 with the preferred range, because of the general over-all characteristics, being from 2:1 to 1:2. In instances where an aldehyde condensate is used as a modifier, operable amounts on a weight basis range up to about 70%, but from a practical standpoint, the preferred percentage is about 10%.

Compositions containing the polyepoxides and the autoester or such compositions modified with aldehyde condensates may be used as mixtures or at varying intermediate stages of reaction. The initial mixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used together without a solvent, giving directly a composition which, on the application of heat, converts to an infusible, insoluble final product.

For the preparation of semi-liquid adhesive compositions, low-melting or syrupy polyepoxides would be used with a low-melting autoester or autoester and aldehyde condensate. For various other applications, higher melting compositions are desirable in which case partially polymerized mixtures of the polyepoxide and the autoester could advantageously be used. An alternative method of obtaining the higher melting compositions is to choose higher melting forms of the polyepoxide and autoester.

In making the new compositions and products herein described, the polyepoxides and the autoester or such compositions modified with aldehyde condensates may be used in regulated proportions without the addition of other materials. For certain uses, other components are often advantageously added, including filling and compounding materials, plasticizers, pigments, etc. Compositions which tend to give somewhat brittle products on conversion to the insoluble, infusible state are advantageously compounded with plasticizers. For most applications, however, it is possible to obtain suitable flexibility and toughness by regulating the proportions and types of reacting ingredients, thereby obviating the need for plasticizers.

The application of heat to the mixtures herein set forth may involve several chemical reactions. It will be appreciated that the reactions involved are very complex and the extent to which each takes place will vary with the temperature used in heat treating, the period of time therefor, and with the particular types of polyepoxides, aldehyde condensate, if used, and autoester chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl groups, and reaction of epoxide groups with active hydrogen attached to a nitrogen atom, all of which take place to some extent simultaneously in forming the final products.

The present invention provides a wide range of reaction compositions and products including initial mixtures of the polyepoxides, aldehyde condensates, and the autoesters, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness, and flexibility, the final infusible, insoluble products have outstanding chemical properties, such as high resistance to oxidation, water, alkali, acids, and organic solvents. It has also been observed that the final conversion products possess unusually good adhesion to most surfaces including metal, glass, wood, and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is unusually low, apparently due to the high molecular weight and rigid cross-linked structure of the final compositions.

Examples 19 to 151, inclusive, illustrate the preparation of insoluble, infusible protective coating films from the compositions of this invention. In the preparation of the composition for heat curing to form the protective coating films, each of the autoesters and the polyepoxides with the exception of epoxidized polyesters were dissolved in methyl ethyl ketone to a nonvolatile content of 40–60%. The epoxidized polyesters were used at the nonvolatile and in the solvent in which they were prepared. The aldehyde condensates were dissolved in a mixture of methyl ethyl ketone and butanol to a nonvolatile content of 40–60%. Mixtures of the resinous autoester and polyepoxides or such compositions modified with aldehyde condensates were found to be stable for extended periods of time at normal temperatures. Mixtures of the solutions were spread on panels with a .002" Bird applicator and the films were baked for periods of 30 to 90 minutes at temperatures ranging from 175–250° C. Proportions as used in the following table refer to parts by weight and are based on the nonvolatile content of the solutions of reactants.

| Ex. No. | Parts of polyepoxide | Parts of interester | Parts of aldehyde condensate | Baking schedule, min./° C. | Films resistance Boiling water, hr. | Films resistance 5% aqueous NaOH at 25° C., hr. |
|---|---|---|---|---|---|---|
| 19 | 8.1 Epon 1001 | 5.0 Ex. 1 | | 40/195 | 8 | 168 |
| 20 | 9.3 Epon 1001 | 5.0 Ex. 2 | | 40/195 | 8 | 168 |
| 21 | 15.0 Epon 1001 | 5.0 Ex. 3 | | 40/195 | 8 | 168 |
| 22 | 14.9 Epon 1004 | 5.0 Ex. 1 | | 40/195 | 8 | 168 |
| 23 | 17.2 Epon 1004 | 5.0 Ex. 2 | | 40/195 | 8 | 168 |
| 24 | 14.0 Epon 1004 | 2.5 Ex. 3 | | 40/195 | 8 | 168 |
| 25 | 14.8 Epon 1007 | 2.5 Ex. 1 | | 40/195 | ⅙ | 168 |
| 26 | 17.0 Epon 1007 | 2.5 Ex. 2 | | 40/195 | ⅙ | 168 |
| 27 | 27.7 Epon 1007 | 2.5 Ex. 3 | | 40/195 | ⅙ | 168 |
| 28 | 5.6 Epon 864 | 5.0 Ex. 1 | | 40/195 | 8 | 168 |
| 29 | 6.5 Epon 864 | 5.0 Ex. 2 | | 30/200 | 8 | 168 |
| 30 | 10.5 Epon 864 | 5.0 Ex. 3 | | 30/200 | 8 | 168 |
| 31 [1] | 14.9 Epon 1004 | 5.0 Ex. 1 | | 30/175 | 8 | 168 |
| 32 [1] | 15.0 Epon 1001 | 5.0 Ex. 3 | | 30/175 | 8 | 168 |
| 33 | 1.5 Epon 864 | 8.5 Ex. 1 | | 60/200 | 8 | 32 |
| 34 | 4.8 Ex. 4 | 5.0 Ex. 1 | | 90/200 | 8 | 8 |
| 35 | 9.0 Ex. 4 | 5.0 Ex. 3 | | 90/200 | 8 | ½ |
| 36 | 6.4 Ex. 5 | 5.0 Ex. 2 | | 60/200 | 8 | ¼ |
| 37 | 10.4 Ex. 5 | 5.0 Ex. 3 | | 60/200 | 8 | ⅙ |
| 38 | 4.9 Ex. 6 | 5.0 Ex. 1 | | 60/200 | 8 | 3 |
| 39 | 5.6 Ex. 6 | 5.0 Ex. 2 | | 60/200 | 8 | 4 |
| 40 [1] | 6.4 Ex. 5 | 5.0 Ex. 2 | | 30/175 | 8 | 1½ |
| 41 [1] | 9.0 Ex. 4 | 5.0 Ex. 3 | | 30/175 | 8 | 1½ |
| 42 | 1.5 Ex. 5 | 8.5 Ex. 1 | | 60/200 | ¾ | 2 |
| 43 | 8.5 Ex. 5 | 1.5 Ex. 3 | | 30/200 | 2½ | ⅙ |
| 44 | 4.4 Ex. 8 | 5.0 Ex. 1 | | 60/200 | 8 | ¼ |
| 45 | 5.0 Ex. 8 | 5.0 Ex. 2 | | 60/200 | 8 | 1¼ |
| 46 | 8.2 Ex. 8 | 5.0 Ex. 3 | | 90/200 | 8 | ⅙ |
| 47 | 8.3 Ex. 7 | 5.0 Ex. 1 | | 60/200 | 8 | 1¼ |
| 48 | 9.6 Ex. 7 | 5.0 Ex. 2 | | 60/200 | 8 | 4 |
| 49 | 15.5 Ex. 7 | 5.0 Ex. 3 | | 60/200 | 1½ | 3 |
| 50 [1] | 5.0 Ex. 8 | 5.0 Ex. 2 | | 30/200 | ¼ | ⅙ |
| 51 [1] | 8.3 Ex. 7 | 5.0 Ex. 1 | | 30/175 | ¼ | 1¾ |
| 52 | 1.5 Ex. 8 | 8.5 Ex. 1 | | 60/200 | ¾ | 32 |
| 53 | 8.5 Ex. 7 | 1.5 Ex. 3 | | 30/200 | 2½ | 3¾ |
| 54 | 5.1 Ex. 9 | 10.0 Ex. 1 | | 30/200 | 8 | 8 |
| 55 | 5.9 Ex. 9 | 10.0 Ex. 2 | | 30/200 | 8 | 24 |
| 56 | 9.5 Ex. 9 | 10.0 Ex. 3 | | 30/200 | 8 | ¼ |
| 57 | 6.7 Ex. 10 | 10.0 Ex. 1 | | 30/200 | 8 | 54 |
| 58 | 7.8 Ex. 10 | 10.0 Ex. 2 | | 30/200 | 8 | 54 |
| 59 | 12.6 Ex. 10 | 10.0 Ex. 3 | | 30/200 | 8 | 8 |
| 60 [1] | 5.9 Ex. 9 | 10.0 Ex. 2 | | 30/175 | 1½ | 32 |
| 61 [1] | 6.7 Ex. 10 | 10.0 Ex. 1 | | 30/175 | 1½ | 32 |
| 62 | 1.5 Ex. 9 | 8.5 Ex. 1 | | 60/200 | 1¾ | 8 |
| 63 | 8.5 Ex. 10 | 1.5 Ex. 3 | | 30/200 | 2½ | 2⅙ |
| 64 | 9.3 Epon 1001 | 5.0 Ex. 2 | 1.4 Ex. 11 | 30/200 | 8 | 168 |
| 65 | 10.5 Epon 864 | 5.0 Ex. 3 | 1.6 Ex. 11 | 30/200 | 8 | 168 |
| 66 | 14.9 Epon 1004 | 5.0 Ex. 1 | 2.0 Ex. 12 | 30/200 | 8 | 168 |
| 67 | 14.0 Epon 1004 | 2.5 Ex. 3 | 1.7 Ex. 13 | 30/200 | 8 | 168 |
| 68 | 27.7 Epon 1007 | 2.5 Ex. 3 | 3.0 Ex. 13 | 30/200 | 8 | 168 |
| 69 | 15.0 Epon 1001 | 5.0 Ex. 3 | 2.0 Ex. 15 | 30/200 | 8 | 168 |
| 70 | 14.8 Epon 1007 | 2.5 Ex. 1 | 1.7 Ex. 15 | 60/200 | ⅙ | 168 |
| 71 | 6.5 Epon 864 | 5.0 Ex. 2 | 1.2 Ex. 14 | 30/200 | 8 | 168 |
| 72 [1] | 15.0 Epon 1001 | 5.0 Ex. 3 | 2.0 Ex. 13 | 30/175 | 8 | 168 |
| 73 [1] | 14.9 Epon 1004 | 5.0 Ex. 1 | 2.0 Ex. 12 | 30/175 | 8 | 168 |
| 74 | 2.5 Epon 864 | 2.5 Ex. 1 | 5.0 Ex. 17 | 30/200 | ¾ | 4 |
| 75 | 1.0 Epon 864 | 8.0 Ex. 3 | 1.0 Ex. 17 | 30/200 | ¾ | ¼ |
| 76 | do | 1.0 Ex. 2 | 8.0 Ex. 17 | 30/200 | ⅙ | 4 |
| 77 | 4.9 Ex. 6 | 5.0 Ex. 1 | 1.0 Ex. 11 | 30/200 | 8 | 30 |
| 78 | 6.4 Ex. 5 | 5.0 Ex. 2 | 1.1 Ex. 12 | 30/200 | 8 | 6 |
| 79 | 9.0 Ex. 4 | 5.0 Ex. 3 | 1.4 Ex. 13 | 30/200 | 6 | 3 |
| 80 | 6.4 Ex. 5 | 5.0 Ex. 2 | 1.1 Ex. 15 | 30/200 | 6 | ¼ |
| 81 | 4.8 Ex. 4 | 5.0 Ex. 1 | 1.0 Ex. 14 | 45/200 | 8 | 8 |
| 82 [1] | 9.0 Ex. 4 | 5.0 Ex. 3 | 1.4 Ex. 12 | 30/175 | ½₁₂ | ½ |
| 83 | 1.0 Ex. 5 | 8.0 Ex. 1 | 1.0 Ex. 17 | 30/200 | 8 | 8 |
| 84 | 8.0 Ex. 5 | 1.0 Ex. 3 | 1.0 Ex. 16 | 30/200 | 8 | ⅙ |
| 85 | 2.5 Ex. 5 | 2.5 Ex. 3 | 5.0 Ex. 17 | 30/200 | ⅓ | 8 |
| 86 | 1.0 Ex. 5 | 1.0 Ex. 3 | 8.0 Ex. 17 | 30/200 | ⅙ | ½ |
| 87 | 1.0 Ex. 8 | 8.0 Ex. 1 | 1.0 Ex. 17 | 30/200 | 8 | 32 |
| 88 | 5.0 Ex. 8 | 5.0 Ex. 2 | 1.0 Ex. 11 | 90/200 | 8 | 6½ |
| 89 | 8.3 Ex. 7 | 5.0 Ex. 1 | 1.3 Ex. 11 | 30/200 | 8 | 8 |
| 90 | 5.0 Ex. 8 | 5.0 Ex. 2 | 1.0 Ex. 12 | 60/200 | 4½ | 8 |
| 91 | 9.6 Ex. 7 | 5.0 Ex. 2 | 1.5 Ex. 12 | 30/200 | 8 | 12 |
| 92 | 15.5 Ex. 7 | 5.0 Ex. 3 | 2.1 Ex. 13 | 30/200 | 2 | 3 |
| 93 | 8.2 Ex. 8 | 5.0 Ex. 3 | 1.3 Ex. 15 | 60/200 | 4½ | ⅙ |
| 94 | 4.4 Ex. 8 | 5.0 Ex. 1 | 0.9 Ex. 14 | 45/200 | 2¼ | ¾ |

| Ex. No. | Parts of poly-epoxide | Parts of in-terester | Parts of aldehyde condensate | Baking schedule, min./°C. | Films resistance Boiling water, hr. | 5% aqueous NaOH at 25° C., hr. |
|---|---|---|---|---|---|---|
| 95 [1] | 8.3 Ex. 7 | 5.0 Ex. 1 | 1.3 Ex. 13 | 30/175 | 1 | 8 |
| 96 | 8.0 Ex. 7 | 1.0 Ex. 3 | 1.0 Ex. 16 | 30/200 | 3½ | 2⅙ |
| 97 | 2.5 Ex. 8 | 2.5 Ex. 3 | 5.0 Ex. 17 | 30/200 | ⅙ | ¼ |
| 98 | 1.0 Ex. 8 | 1.0 Ex. 3 | 8.0 Ex. 17 | 30/200 | ⅙ | ¼ |
| 99 | 6.7 Ex. 10 | 10.0 Ex. 1 | 1.7 Ex. 13 | 30/200 | 8 | 30 |
| 100 | 5.9 Ex. 9 | 10.0 Ex. 2 | 1.6 Ex. 12 | 30/200 | 8 | 27 |
| 101 | 5.1 Ex. 9 | 10.0 Ex. 1 | 1.5 Ex. 12 | 30/200 | 8 | 27 |
| 102 | 9.5 Ex. 9 | 10.0 Ex. 3 | 2.0 Ex. 13 | 30/200 | 8 | 4½ |
| 103 | 9.5 Ex. 9 | 10.0 Ex. 3 | 2.0 Ex. 15 | 30/200 | 8 | ⅙ |
| 104 | 12.6 Ex. 10 | 10.0 Ex. 3 | 2.3 Ex. 14 | 30/200 | 4½ | 12 |
| 105 [1] | 6.7 Ex. 10 | 10.0 Ex. 1 | 17. Ex. 13 | 30/175 | 8 | 32 |
| 106 | 1.0 Ex. 9 | 8.0 Ex. 1 | 1.0 Ex. 17 | 30/200 | ¾ | 8 |
| 107 | 2.0 Ex. 9 | 3.0 Ex. 1 | 5.0 Ex. 17 | 30/200 | ¾ | 32 |
| 108 | 1.0 Ex. 10 | 1.0 Ex. 3 | 8.0 Ex. 17 | 30/200 | ⅙ | 68 |
| 109 | 4.4 Ex. 8 | 5.0 Ex. 1 | 0.9 Ex. 18 | 30/250 | 2 | 4½ |
| 110 | 8.3 Ex. 7 | 5.0 Ex. 1 | 1.3 Ex. 18 | 30/250 | 8 | 6 |
| 111 | 9.6 Ex. 7 | 5.0 Ex. 2 | 1.5 Ex. 18 | 30/250 | 1¼ | 4½ |
| 112 | 8.2 Ex. 8 | 5.0 Ex. 3 | 1.3 Ex. 16 | 45/200 | 8 | ⅙ |
| 113 | 15.5 Ex. 7 | 5.0 Ex. 3 | 2.1 Ex. 16 | 30/200 | 2 | 1 |
| 114 [1] | 8.3 Ex. 7 | 5.0 Ex. 1 | 1.3 Ex. 16 | 30/175 | ½ | ⅙ |
| 115 | 4.8 Ex. 4 | 5.0 Ex. 1 | 1.0 Ex. 18 | 30/200 | 8 | 8 |
| 116 | 6.4 Ex. 5 | 5.0 Ex. 2 | 1.1 Ex. 17 | 30/200 | 8 | 6 |
| 117 | 5.6 Ex. 6 | 5.0 Ex. 2 | 1.1 Ex. 17 | 30/200 | 8 | 30 |
| 118 | 10.4 Ex. 5 | 5.0 Ex. 3 | 1.5 Ex. 16 | 30/200 | 8 | ⅙ |
| 119 [1] | 9.0 Ex. 4 | 5.0 Ex. 3 | 1.4 Ex. 17 | 30/175 | 4½ | 32 |
| 120 [1] | 6.4 Ex. 5 | 5.0 Ex. 2 | 1.1 Ex. 16 | 30/175 | 4½ | 1 |
| 121 | 8.0 Ex. 5 | 1.5 Ex. 3 | 1.0 Ex. 13 | 30/200 | 2½ | ⅙ |
| 122 | 1.0 Ex. 5 | 8.0 Ex. 2 | 1.0 Ex. 12 | 20/200 | ¾ | 5 |
| 123 | 2.5 Ex. 5 | 2.5 Ex. 3 | 5.0 Ex. 13 | 30/200 | ¾ | ¼ |
| 124 | 1.0 Ex. 5 | 1.0 Ex. 3 | 8.0 Ex. 13 | 30/200 | ⅙ | ¼ |
| 125 | 8.1 Epon 1001 | 5.0 Ex. 1 | 1.3 Ex. 18 | 30/200 | 8 | 168 |
| 126 | 14.8 Epon 1007 | 2.5 Ex. 1 | 1.8 Ex. 18 | 30/200 | 8 | 168 |
| 127 | 5.6 Epon 864 | 5.0 Ex. 1 | 1.1 Ex. 18 | 30/200 | 8 | 168 |
| 128 | 15.0 Epon 1001 | 5.0 Ex. 2 | 2.0 Ex. 17 | 30/200 | 8 | 168 |
| 129 | 17.2 Epon 1004 | 5.0 Ex. 2 | 2.3 Ex. 17 | 30/200 | 8 | 168 |
| 130 | 14.0 Epon 1004 | 2.5 Ex. 2 | 1.7 Ex. 16 | 45/200 | 8 | 168 |
| 131 | 17.0 Epon 1007 | 2.5 Ex. 2 | 2.0 Ex. 16 | 45/200 | 8 | 168 |
| 132 | 10.5 Epon 864 | 5.0 Ex. 3 | 1.6 Ex. 16 | 30/200 | 8 | 168 |
| 133 [1] | 15.0 Epon 1001 | 5.0 Ex. 3 | 2.0 Ex. 17 | 30/175 | 8 | 168 |
| 134 [1] | 14.9 Epon 1004 | 5.0 Ex. 1 | 2.0 Ex. 16 | 30/175 | 8 | 168 |
| 135 | 1.0 Epon 864 | 8.0 Ex. 2 | 1.0 Ex. 12 | 30/200 | ¾ | 5 |
| 136 | 2.5 Epon 864 | 2.5 Ex. 3 | 5.0 Ex. 12 | 30/200 | ¾ | 4½ |
| 137 | 1.0 Epon 864 | 1.0 Ex. 3 | 8.0 Ex. 13 | 30/200 | ⅙ | ¼ |
| 138 | 8.0 Ex. 7 | 1.0 Ex. 3 | 1.0 Ex. 13 | 30/200 | ¾ | ½ |
| 139 | 1.0 Ex. 8 | 8.0 Ex. 2 | 1.0 Ex. 12 | 30/200 | ¾ | 8 |
| 140 | 2.5 Ex. 8 | 2.5 Ex. 3 | 5.0 Ex. 13 | 30/200 | ⅙ | ¾ |
| 141 | 1.0 Ex. 8 | 1.0 Ex. 3 | 8.0 Ex. 13 | 30/200 | ⅙ | ¼ |
| 142 | 5.1 Ex. 9 | 10.0 Ex. 1 | 1.5 Ex. 18 | 30/200 | 8 | 12 |
| 143 | 5.9 Ex. 9 | 10.0 Ex. 2 | 1.6 Ex. 17 | 30/200 | 8 | 30 |
| 144 | 7.8 Ex. 10 | 10.0 Ex. 2 | 1.8 Ex. 17 | 30/200 | 8 | 168 |
| 145 | 7.8 Ex. 10 | 10.0 Ex. 2 | 1.8 Ex. 16 | 30/200 | 8 | 30 |
| 146 | 12.6 Ex. 10 | 10.0 Ex. 3 | 2.3 Ex. 16 | 30/200 | 8 | 6 |
| 147 [1] | 5.9 Ex. 9 | 10.0 Ex. 2 | 1.6 Ex. 17 | 30/175 | 5½ | 7 |
| 148 | 8.0 Ex. 10 | 1.0 Ex. 3 | 1.0 Ex. 12 | 30/200 | 2½ | 5/12 |
| 149 | 1.0 Ex. 9 | 8.0 Ex. 2 | 1.0 Ex. 12 | 30/200 | ¾ | 5 |
| 150 | 2.5 Ex. 9 | 2.5 Ex. 3 | 5.0 Ex. 13 | 30/200 | ¾ | ½ |
| 151 | 1.0 Ex. 9 | 1.0 Ex. 3 | 8.0 Ex. 13 | 30/200 | 4½ | ¼ |

[1] .02 part NaOEt catalyst was added.

It should be appreciated that while there are above disclosed but a limited number of embodiments of this invention, it is possible to produce still other embodiments without departing from the inventive concept herein disclosed.

It is claimed and desired to secure by Letters Patent:

1. A new composition of matter comprising the insoluble, infusible reaction product obtained by heating (A) a resinous polyhydric phenol comprising a self-ester of a pentanoic acid consisting essentially of 4,4-bis(4-hydroxyaryl)pentanoic acid wherein the hydroxyaryl radical is a hydroxyphenyl radical and is free from substituents other than alkyl groups of from 1–5 carbon atoms and (B) an organic polyepoxide containing an average of more than one oxirane group per molecule and being free of groups reactive with said self-ester (A) other than hydroxyl, carboxyl and oxirane.

2. The composition as described in claim 1 wherein (A) is a resinous polyhydric phenol comprising a self-ester of a pentanoic acid consisting essentially of 4,4-bis-(4-hydroxyaryl)pentanoic acid wherein the hydroxyaryl radical is a hydroxyphenyl radical and is free from substituents other than alkyl groups of one carbon atom.

3. The composition as described in claim 1 wherein (A) is a resinous polyhydric phenol comprising a self-ester of a pentanoic acid consisting essentially of 4,4-bis(4-hydroxyphenyl)pentanoic acid.

4. The composition as described in claim 3 wherein (B) is a complex resinous epoxide which is a polymeric polyhydric alcohol having aromatic nuclei united through ether oxygen and terminating in oxirane substituted chains.

5. The composition as described in claim 3 wherein (B) is a polyepoxide polyester of tetrahydrophthalic acid and a glycol, wherein the epoxy oxygen bridges adjacent carbon atoms on the tetrahydrophthalic acid residue.

6. The composition as described in claim 3 wherein (B) is an aliphatic polyepoxide, said polyepoxide having only hydroxyl substituents in addition to oxirane groups.

7. A new composition of matter comprising the insoluble, infusible reaction product obtained by heating (A) a resinous polyhydric phenol comprising a self-ester of a pentanoic acid consisting essentially of 4,4-bis(4-hydroxyaryl)pentanoic acid wherein the hydroxyaryl radical is a hydroxyphenyl radical and is free from substituents other than alkyl groups of from 1–5 carbon atoms; (B) up to about 70% by weight of a fusible condensation product of formaldehyde and a member of the group consisting of phenol and an organic ammonia derivative, said ammonia derivative being at least one member of the group consisting of urea, thiourea, melamine, p-toluenesulfonamide and alkyl derivatives thereof and (C) an organic polyepoxide containing an average of more than one oxirane group per molecule and being free of groups reactive with said self-ester (A) and said condensate (B) other than hydroxyl, carboxyl, and oxirane.

8. The composition as described in claim 7 wherein (A) is a resinous polyhydric phenol comprising a self-ester of a pentanoic acid consisting essentially of 4,4-bis-(4-hydroxyaryl)pentanoic acid wherein the hydroxyaryl radical is a hydroxyphenyl radical and is free from substituents other than alkyl groups of one carbon atom.

9. The composition as described in claim 7 wherein (A) is a resinous polyhydric phenol comprising a self-ester of 4,4-bis(4-hydroxyphenyl)pentanoic acid.

10. The composition as described in claim 9 wherein (C) is a complex resinous epoxide which is a polymeric polyhydric alcohol having aromatic nuceli united through ether oxygen and terminating in oxirane substituted chains.

11. The composition as described in claim 9 wherein (C) is a polyepoxide polyester of tetrahydrophthalic acid and a glycol, wherein the epoxy oxygen bridges adjacent carbon atoms on the tetrahydrophthalic acid residue.

12. The composition as described in claim 9 wherein (C) is an aliphatic polyepoxide, said polyepoxide having only hydroxyl substituents in addition to oxirane groups.

13. The composition as described in claim 9 wherein (B) is up to about 20% by weight of the fusible condensation product of formaldehyde and at least one organic ammonia derivative of the group consisting of urea, thiourea, melamine, p-toluenesulfonamide and alkyl substituted derivatives thereof.

14. The composition as described in claim 9 wherein (B) is up to about 30% by weight of the fusible condensation product of formaldehyde and a phenol.

No references cited.

UNITED STATES PATENT OFFICE
Certificate of Correction

Patent No. 2,907,727

October 6, 1959

Sylvan O. Greenlee

It is hereby certified that error appears in the printed specification of the above numbered patent requiring correction and that the said Letters Patent should read as corrected below.

Column 2, Formula I, the upper right-hand portion thereof should appear as shown below instead of as in the patent:

columns 3 and 4, Formula IV, the right-hand portion thereof should appear as shown below instead of as in the patent:

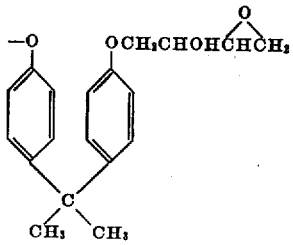

column 6, Equation VII, the right-hand portion thereof should appear as shown below instead of as in the patent:

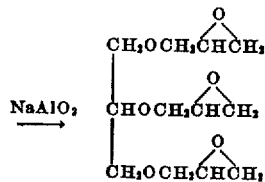

column 12, line 9, for the numeral "64.0" read —6.0—; columns 15 and 16, in the table, sixth column thereof, opposite "Ex. No. 62" for "1¾" read —¾—; columns 17 and 18, in the table, fourth column thereof, opposite "Ex. No. 105" for "17. Ex. 13" read —1.7 Ex. 13—; same table, fifth column thereof, opposite "Ex. No. 127" for "30/209" read —30/200—.

Signed and sealed this 2nd day of August 1960.

[SEAL]

Attest:
KARL H. AXLINE,
*Attesting Officer.*

ROBERT C. WATSON,
*Commissioner of Patents.*